Nov. 23, 1954  A. A. SCHAUER ET AL  2,695,043
PLANING TOOL FOR THE MANUFACTURE OF SPIRALLIKE BODIES
Filed Nov. 12, 1948  2 Sheets-Sheet 1
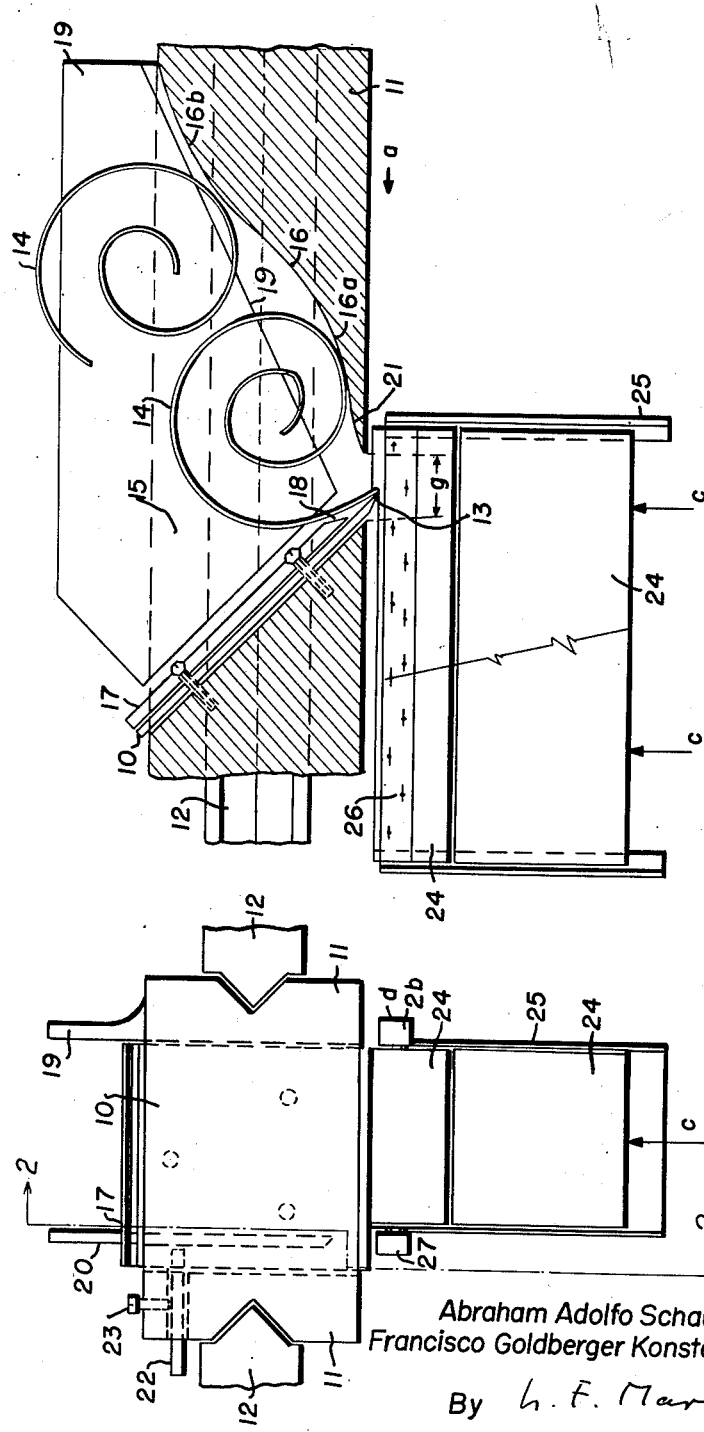
Abraham Adolfo Schauer
Francisco Goldberger Konstandt   Inventors
By  L. F. Mart  Attorney

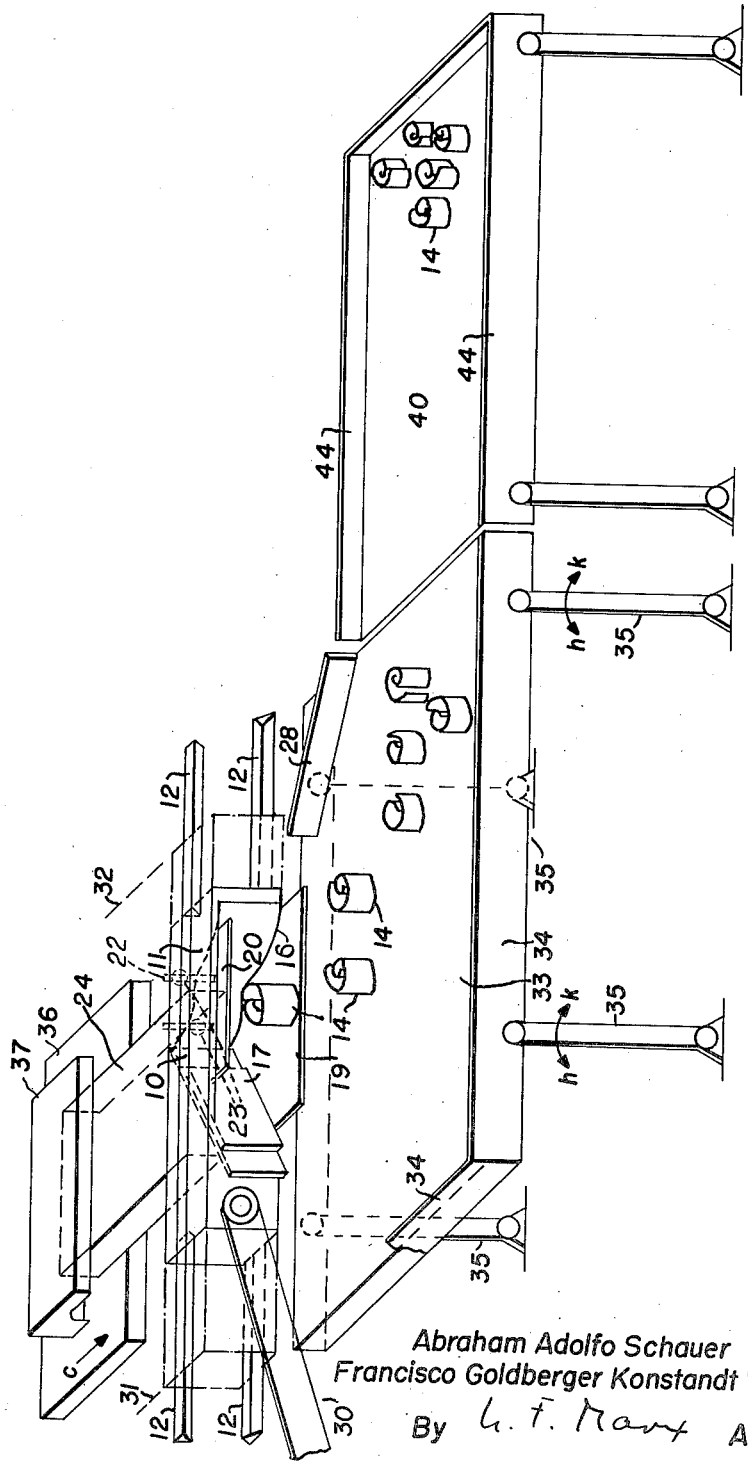

United States Patent Office 2,695,043
Patented Nov. 23, 1954

2,695,043

PLANING TOOL FOR THE MANUFACTURE OF SPIRALLIKE BODIES

Abraham A. Schauer and Francisco Goldberger Konstandt, Buenos Aires, Argentina

Application November 12, 1948, Serial No. 59,544

8 Claims. (Cl. 144—2)

The present invention relates to a machine and details of a manufacturing process, suitable for quantity production, for the manufacture of spiral-shaped, thin-walled bodies, produced from wood, metal or other suitable materials, which spirals are placed edgewise between covering or skin plates, for the manufacture of panels, partitions and other similar parts for buildings, furniture, aircraft parts, truck and trailer bodies, shipping containers, etc.

It is one of the objects of the invention to provide a plane-like housing in which a blade is inserted, in a manner to be described in detail later on. This housing is moving, in a reciprocating motion, and guided so as to move along a straight line or in a continuous or reciprocating rotary motion.

Other details of this invention refer to guiding and deflecting bodies, formed so as to produce the desired curvature in the shaving, shaved off the board or block, etc. out of which these spirals are to be made.

Another part of this invention refers to means provided to prevent jamming or clogging of the mechanism and means to make possible continuous production of such spirals.

Still another object of the invention is to provide means for keeping the spirals in vertical position and to transport same automatically to the place of their final use.

These and other objects of the invention will be pointed out in the following description and claims and illustrated in the accompanying drawing which illustrates, by way of example, the principle of the invention and preferred modifications thereof suitable for applying said principle.

In the drawings:

Fig. 1 is an end view on the left end of the spiral producing machine shown in Fig. 2, seen in the direction of motion of the plane-like body;

Fig. 2 is a top view of the spiral-producing machine in its operating position, shown partially in section along line 2—2 of Fig. 1; and Fig. 3 shows a schematic, perspective view of the entire spiral-producing machine, together with the mechanism for transporting the spirals.

Referring now more particularly to the drawings, there is shown in Figs. 1, 2 and 3 a blade 10 and the housing 11 which is guided by guide blocks (or ways) 12 and driven by a mechanism, not shown, to reciprocate horizontally in these guide blocks.

This plane, though similar to a normal plane, is entirely novel and radically different in the following points:

a. The cutting edge 13 of the blade 10 is arranged vertically, instead of horizontally, as customary. Accordingly the spirals 14 are formed immediately in a vertical position in which they will be transported and supplied to the hollow panel, or the like later on.

b. A considerable amount of space 15 in housing 11 is provided so that spirals 14 can be formed and ejected without being damaged, or without sticking or catching on any part of housing 11.

c. The beginning of contour 16 of the housing 11, opposite blade 10, forms with blade 10 an angle, always larger than 90°.

d. Contour 16 is not straight, but slightly S-shaped, so as to be concave in portion 16a, near blade 10, and convex on the other end, portion 16b. This arrangement assures gentle pressure against the spirals during the return of the plane housing 11 in direction a, thus avoiding damage to the spirals.

e. Width of opening g in housing 11 for blade 10 is 0.3″ or more. This wide opening permits the formation of the spiral 14 to start directly in front of the blade 10 at the cutting edge 13 where the shave begins to be shaved off the board or blank, while in a conventional plane the tendency will be for the shaving to begin breaking at this point.

f. The first part 21 of the concave contour 16a consists of a well rounded edge, for the same purpose as explained under e.

g. The blade holder 17 is provided with a concave contour 18 at the lower edge, with a radius about corresponding to the mean radius of the desired spiral 14, thereby controlling the size of the spiral 14.

h. The concave lower edge 18 of the blade holder 17 is approximately ⅛″ or more above the cutting edge of blade 10.

i. The lower portion of the housing 11 in the gap between blade 10 and contour 16 is extended outward to form a platform 19 supporting spirals 14 during the period of formation.

j. Corresponding to the foregoing platform 19 which forms a solid part of the housing 11, an adjustable plate 20, held by two pins 22 and set screws 23, or other suitable means is provided on top so as to prevent any deformation of the spirals 14 along their vertical axis. These arrangements are necessary to assure proper forming of the spirals, contrary to a conventional plane where the blade holder's lower edge is located very close to the cutting edge of the plane, in order to obtain a smooth finished surface.

Figs. 1 and 2 furthermore indicate suitable means for moving the boards or blanks 24 from which the spirals are to be shaped continuously in the direction c against the reciprocating blade 10 in housing 11. During the cutting process, clamping members 26 and 27 are pressed toward each other by means, not shown, to hold the board or blank 24 firmly in place. During the return stroke and after blade cutting edge 13 has cleared the blank 24, the clamping pressure of members 26 and 27 is released and a feeding mechanism, not shown, feeds board or blank 24 forward in direction c, by an adjustable amount corresponding to the desired thickness of the spirals 14.

Referring to Fig. 3 there are shown therein housing 11, blade 10, blade holder 17, housing extension 19, adjustable top plate 20 and the guides 12. The link 30 illustrates schematically a portion of the means for moving the housing between points 31 and 32 in reciprocating fashion. The finished spirals 14 slide onto plate 33, which is provided with a raised edge 34 preventing the spirals 14 from sliding off the plate.

This plate 33 is arranged in such a manner as will permit a vibrating horizontal motion. This may be accomplished by supporting links 35 swinging in the direction h—k as indicated by arrows. A mechanism, not shown, acting on links 35 drives the plate 33 alternatingly in quick succession in a slow movement of short amplitude in the direction k and in a short quick movement in the direction h. As a result, the spirals 14 on plate 33 are moving to the right in the direction of the next table or plate 40. This plate with its raised sidewalls 44 represents a final station on which the spirals 14 may be gathered in an upright position and in amounts ready to be transferred into hollow panels in any suitable manner, not shown.

Having described specific embodiments of the invention, it will be understood that the same is not to be restricted thereto, but is broad enough to cover all structures coming within the scope of the annexed claims.

Having thus described the invention, what is claimed as new and desired to be secured by Letters Patent is:

1. A planing tool comprising a plane body, a cutting knife having a cutting edge protruding through one surface of said body, said knife being supported in an inclined position on one face of a recess provided in said body, said recess extending through said surface, said body and an opposite surface of said body and expanding from said first named surface toward said opposite surface so as to provide an unobstructed opening in said body and opposite surface sufficiently large to permit the free formation and ejection of spiral-shaped shavings through said opening; and a flat plate extending from said recess outwardly in a position substantially perpendicular to said surfaces in a plane close to one end of said edge.

2. A tool as claimed in claim 2 which comprises a second flat plate extending from said recess substantially parallel to said first named plate in a plane close to the other end of said edge.

3. A planing tool comprising a plane body, a cutting knife having a vertical cutting edge, said edge protruding through one vertical surface of said body, said knife being supported in an inclined position on one face of a recess provided in said body, said recess extending through said vertical surface, said body and an opposite vertical surface of said body and expanding in a substantially horizontal direction from said first named surface toward said opposite surface, so as to provide an unobstructed opening in said body and opposite surface sufficiently large to permit the free formation and ejection of spiral-shaped shavings through said opening, and a flat substantially horizontal plate extending from said recess in a plane close to one end of said edge.

4. A tool as claimed in claim 3 which comprises a second flat substantially horizontal plate adjustably arranged with respect to said first-named plate and in spaced relationship thereto and further removed from said end.

5. A planing tool comprising a plane body, a cutting knife having a cutting edge protruding through one surface of said body, said knife being supported in an inclined position on one face of a recess provided in said body, said recess extending through said surface, said body and an opposite surface of said body, said knife-supporting face and the opposed face of said recess diverging from said first-named surface toward said opposite surface so as to provide an unobstructed opening in said body and opposite surface sufficiently large to permit the free formation and ejection of spiral-shaped shavings through said opening, said opposite recess face being S-shaped, said adjacent portion forming at least part of the concave section of the S-shape and portions of said opposite recess face which are further removed from said cutting edge comprising the convex section of the S-shape.

6. A planing tool comprising a plane body, a cutting knife having a cutting edge protruding through one surface of said body, said knife being supported in an inclined position on one face of a recess provided in said body, said recess extending through said surface, said body and an opposite surface of said body, said knife-supporting face and the opposed face of said recess diverging from said first-named surface toward said opposite surface so as to provide an unobstructed opening in said body and opposite surface sufficiently large to permit the free formation and ejection of spiral-shaped shavings through said opening, a blade holder adapted to hold said knife between said holder and said supporting face and extending along said knife to a position approaching, but removed from said cutting edge, the holder portion adjacent said cutting edge having a concave free surface facing said recess, the radius of said concave surface corresponding approximately to the mean radius of the spiral-shaped shavings to be formed.

7. A planing tool comprising a plane body, a cutting knife having a cutting edge protruding through one surface of said body, said knife being supported in an inclined position on one face of a recess provided in said body, said recess extending through said surface, said body and an opposite surface of said body, said knife-supporting face and the opposed face of said recess diverging from said first-named surface toward said opposite surface so as to provide an unobstructed opening in said body and opposite surface sufficiently large to permit the free formation and ejection of spiral-shaped shavings through said opening, said cutting edge being in a substantially vertical position, said recess diverging in a substantially horizontal direction, and said first-named and opposite surface being substantially vertical, a substantially horizontal plate arranged on said body adjacent the widest end of said recess approximately at the level of a horizontal body face, said horizontal plate forming an extension of said horizontal face beyond the outline of said body in the direction in which said recess diverges.

8. A tool as claimed in claim 7 which comprises a second substantially horizontal plate adjustably arranged in said recess adjacent to the horizontal body face opposite said first-named horizontal body face in spaced relationship to said first named plate.

References Cited in the file of this patent

UNITED STATES PATENTS

| Number | Name | Date |
|---|---|---|
| 415,918 | Meister | Nov. 26, 1889 |
| 553,322 | Traut et al. | Jan. 21, 1896 |
| 659,287 | Carvin | Oct. 9, 1900 |
| 691,122 | Etzold | Jan. 14, 1902 |
| 960,256 | Bodmer | June 7, 1910 |
| 1,646,645 | Frederickson et al. | Oct. 25, 1927 |
| 1,663,225 | Widman | Mar. 20, 1928 |
| 1,807,251 | Ovenhausen | May 26, 1931 |
| 1,845,562 | Sandberg | Feb. 16, 1932 |
| 1,971,292 | Brauer | Aug. 21, 1934 |
| 2,032,599 | Sloane | Mar. 3, 1936 |
| 2,099,071 | Lundbye | Nov. 16, 1937 |

FOREIGN PATENTS

| Number | Country | Date |
|---|---|---|
| 373,934 | Germany | 1923 |